United States Patent [19]
Klein

[11] 4,153,749
[45] May 8, 1979

[54] CARPETING

[75] Inventor: William G. Klein, Stoughton, Mass.

[73] Assignee: United Technical Products, Inc., Westwood, Mass.

[21] Appl. No.: 807,490

[22] Filed: Jun. 17, 1977

Related U.S. Application Data

[63] Continuation of Ser. No. 633,953, Nov. 20, 1975, abandoned, which is a continuation of Ser. No. 414,309, Nov. 9, 1973, abandoned.

[51] Int. Cl.$^2$ .................... D03D 27/00; B32B 7/00
[52] U.S. Cl. .................... 428/95; 156/310; 427/180; 427/372 R; 428/96; 428/244; 428/283; 428/323
[58] Field of Search .................... 428/85, 87, 95, 96, 428/97, 922, 920, 244, 283, 323; 156/310, 72; 427/180, 372 R

[56] References Cited

U.S. PATENT DOCUMENTS

| 2,302,003 | 11/1942 | Cadwell et al. | 428/85 |
|---|---|---|---|
| 3,196,315 | 7/1965 | Peterson | 428/922 |
| 3,510,386 | 5/1970 | Goins et al. | 428/95 |
| 3,582,445 | 6/1971 | Okuhashi | 428/96 |
| 3,728,205 | 4/1973 | Brindell et al. | 428/97 |
| 3,758,362 | 9/1973 | Brown | 156/310 |
| 3,823,056 | 7/1974 | Cooney | 428/96 |
| 3,961,117 | 6/1976 | Kydonieus | 428/96 |
| 3,970,502 | 7/1976 | Turner | 156/310 |

*Primary Examiner*—William J. Van Balen
*Attorney, Agent, or Firm*—John G. Heimovics

[57] ABSTRACT

An anti-static carpet in which the sole conductive layer is a secondary backing having a surface resistivity less than $10^{11}$ ohms per square. In the disclosed embodiment, the secondary backing includes a backing base and a conductive composition coating on the upper side of the base. The conductive composition comprises latex and carbon black and is applied to the backing base before the secondary and primary backings are attached to each other.

14 Claims, 1 Drawing Figure

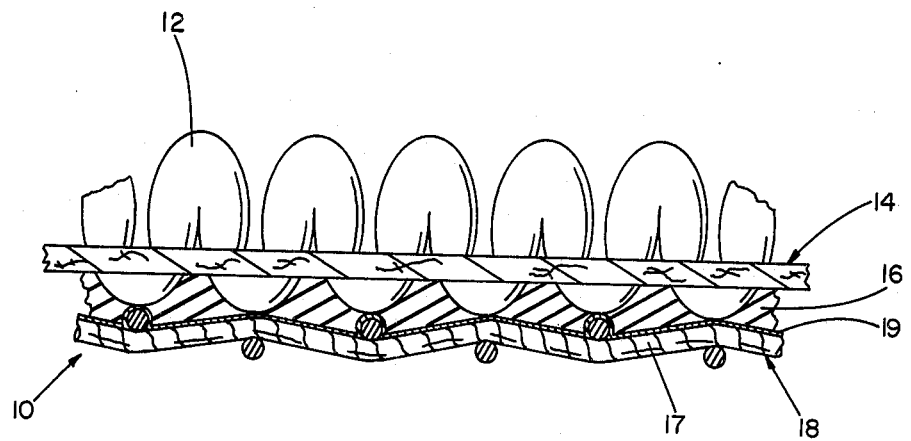

CARPETING

CROSS REFERENCE TO CO-PENDING APPLICATION

This application is a continuation of co-pending application Ser. No. 633,953, filed Nov. 20, 1975, now abandoned, which was a co-pending continuation application of Ser. No. 414,309, filed Nov. 9, 1973, now abandoned.

This invention relates to anti-static fabrics and more particularly, to low static carpets.

In the past, there have been many efforts directed to reducing the problem of static electrification of a carpet. Generally these have involved adding conductive material to the face fibres of the carpet, either as a chemical finish or in the form of discrete conductors such as steel fibres or metallized organic fibres (see my prior U.S. Pat. No. 3,678,675); bonding conductive materials such as aluminum foil to the carpet backs (see U.S. Pat. No. 3,713,960); or applying mutliple layers (tufting adhesive, scrimming adhesive, and back size) of conductive latex (see U.S. Pat. No. 3,728,205) to provide a continuous electrical path from the carpet face to its floor-engaging surface. Often, conductive face yarns have been used in conjunction with conductive foils or latex layers, to both improve the anti-static properties of the face yarns and increase their useful life.

These approaches can be made to function well, but they suffer from serious practical difficulties. Metal films are costly to apply and, in conjunction with conductive face fibres, can constitute an electrical grounding hazard. The conductivity of back sizes can be increased by adding thereto any of a wide range of anti-static agents or conductive carbon blacks, but many chemical agents injure the latex properties of the size, adversely effect tuft binding and secondary back adhesion, and are critically dependent on proportion of additives. Carbon blacks present fewer chemical difficulties, but their great pigmenting strength makes cleaning of manufacturing plants a major problem, and their black color often tends to show through. Conductive face fibres are expensive and may drastically lose effectiveness due to wear and processing damage.

The present invention provides low static carpets which have all the electrostatic advantages of prior practices but none of the difficulties, and which are less expensive and easier to manufacture and have superior wear qualities. Applicant has found that direct electrical contact between a carpet's face yarns and a conductive backing layer is unnecessary, and that the use of multiple conductive layers and special conductive latexes on the bottom of the primary backing may be eliminated. Applicant has also discovered that a low static carpet requires only a conductive secondary backing, that the use of conductive face fibres may be reduced by 75% or more, and that the required conductive composition can be applied to a secondary backing base before the completed backing is attached to the tufted primary, thereby making it possible to manufacture the conductive secondary backing separately and on a commercial basis to enjoy the advantages of carbon black based conductive latexes.

In accordance with applicant's discoveries the invention features, in a carpet including a primary backing, carpet facing yarns secured to the primary backing, and a secondary backing secured to the primary backing, that improvement wherein the secondary backing comprises a conductive polymeric composition applied to the backing base and imparting to the backing a permanent surface resistivity in the range of about $10^5$ to about $10^{11}$ ohms per square, the secondary backing being the sole conductive layer in the carpet. In preferred embodiments in which not more than one out of every 16 to 24 face yarns is conductive and the polymeric composition is applied only to the side of the secondary backing base facing the primary backing and is applied before the secondary and primary backings are attached to each other, the surface resistivity of the secondary backing is in the range of about $10^7$ to $10^{10}$ ohms per square and the conductive layer is a mixture of conductive carbon black, latex and, if desired, a filler such as clay, in an amount in the range of 0.10 to 1.00 oz. per square yard, the carbon black being at least 15 percent and not more than 60 percent of the mixture, and the latex being at least 20% of the mixture.

Other objects, features and advantages will appear from the following detailed description of preferred embodiments of the invention, taken together with the attached drawing which is a sectional view of a carpet embodying the present invention.

Referring more particularly to the drawing, there is shown a tufted carpet, generally designated 10, comprising facing yarns 12 tufted through the non-woven polypropylene primary backing 14 in the conventional manner. The underside of the primary backing and facing yarns is coated with a conventional non-conductive latex size coating layer 16 and a secondary backing 18 is secured to the underside of coating layer 16.

Carpet 10 differs from a conventional carpet in that secondary backing 18 includes not only the usual base 17 (typically jute, as shown, or woven or non-woven polypropylene or polyester), but also a conductive polymeric layer 19 bonded to the upperside thereof and imparting to the secondary backing the desired surface resistivity. Polymeric layer 19 is the sole conductive layer in carpet 10. Primary backing 14, the adhesive (if any) bonding yarns 12 to the primary backing, and the latex size coating layer 16 bonding the secondary backing 18 to the tufted primary backing are all non-conductive.

Some of the face yarns 12 are conductive. However, because of size layer 16, there is no direct contact between yarns 12 and conductive polymeric layer 19. Typical conductive yarns are sold by Brunswick Corporation under the trademark "Brunslon" and shown in my U.S. Pat. No. 3,678,675; and by Rohm and Haas under the mark "X STATIC". Conductive face yarns, however, are not essential to the present invention and are not used in many embodiments, typically light weight carpets weighing less than 25 oz. per square yard. In heavier construction, conductive face yarns may be used, though the concentration of such conductive yarns is far less than that required in conventional anti-static concentrations. In embodiments of the present invention including conductive fibres, there typically will be one conductive fibre for every 16, 24, 32 or 40 ends; in conventional constructions, the concentration is typically one end of conductive fibre for every 8 ends. The relative anti-static performance of carpets constructed in accord with the present invention and conventional carpets, both at the time of shipping and after one year's wear, is shown in the table below. As there indicated, the carpets of the present invention are superior to conventional carpets at the time of shipping (just after manufacture); and applicant's carpets essentially retain their anti-static properties after a year's wear, whereas the anti-static properties of the conventional carpets deteriorated significantly. Any extra cost occasioned by applicant's conductive secondary backing is offset by the superior properties and, as the conductive fibre concentration is reduced below one end in about 24, by savings in conductive fibre.

| Conductive ends per carpet end | Static (kilovolts At shipping) | | After one year's wear | |
|---|---|---|---|---|
| | Conventional Carpet | Applicant's Carpet | Conventional Carpet | Applicant's Carpet |
| 0 | 14.0 | 10.0 | 11.0 | 8.0 |
| 1/40 | 4.1 | 3.2 | 7.5 | 3.2 |
| 1/32 | 4.0 | 3.1 | 7.5 | 3.2 |
| 1/16 | 3.6 | 2.8 | 7.0 | 3.2 |
| 1/8 | 2.8 | 2.0 | 6.5 | 2.0 |

Conductive layer 19 may comprise any of a wide range of conductive polymeric compositions. The composition should be available in latex or solvent form and, typically, will comprise a polymeric carrier (such as carboxylated styrene butadiene, polyvinylchloride, nylon or acrylic) rendered conductive by the addition thereto of a suitable conductive material (such as conductive carbon black or a durable organic anti-static material normally applied to textile or polymeric material). The latter anti-static materials are usually hygroscopic and may contain electrolytes or surfactants. Typical examples of such materials are polyethoxy amides of fatty acids, quaternary ammonium salts, phosphate esters, and alkoxylated amines.

According to the practice of the present invention, the desired permanent surface resistivity is imparted to secondary backing 18 at an early stage of the manufacture of carpet 10, and prior to the time that the secondary backing was secured to the rest of the carpet, including facing yarns 12, primary backing 14, and latex back size layer 16. In the illustrated embodiment, the conductive composition of layer 19 was sprayed onto one side of the secondary backing 17, but the conductive composition may be incorporated on or into the secondary backing in any other desired manner. Typically, it is applied to the backing base in liquid form (by spray, roll, or immersion), and the coated or impregnated secondary backing is then dried and, if necessary cured. The finished secondary backing may also be made conductive during manufacture of the backing base, as by impregnating jute yarns or incorporating a conductive binder or filler in polypropylene or polyester.

Regardless of the type of the particular conductive layer used, or the time or manner in which it is applied, the quantity of conductive composition incorporated in the finished secondary backing is regulated so that the finished backing will have the desired surface resistivity. The resistivity must not be too high or the secondary backing will be too little conductive to have appreciable anti-static properties; the anti-static effectiveness decreases as surface resistivity increases over about $10^{10}$ ohms per square, and by the time it reaches about $10^{12}$ ohms per square the backing is essentially worthless for static control. On the other end of the scale, the surface resistivity must not be too low; resistivity of less than about $10^5$ ohms per square can create a serious safety hazard. The preferred range of surface resistivity for effective anti-static properties and safety is about $10^7$ to $10^{10}$ ohms per square. In commercial production, to insure the secondary backings produced fall within this range, the goal is a secondary backing having a surface resistivity of about $10^9$ ohms per square.

To insure that the finished backing has this desired resistivity, the conductive composition forming layer 19 is applied uniformly to backing base 17. The exact amount of conductive composition required to impart the desired resistivity to the secondary backing depends on the conductivity of the composition. For example, a large quantity of a low conductivity composition will have about the same final effect as will a smaller amount of a more conductive composition. Typically, at the conductive compositions are applied such that weight of the deposited conductive composition (dry weight) is between 0.10 ounces and 0.50 ounces per square yard of backing base.

The conductivity of any particular composition depends in turn on its constitutents (polymeric carrier, conductive material and, if desired, binders or fillers), and also on their relative amounts. The relative amounts can be varied quite widely, but the percentage of conductive material must exceed some threshold level if the composition is to be conductive at all, and the amount of polymeric carrier must not be too low or its characteristics and the properties (e.g., bondability, flexibility, cure) of the applied conductive composition may be adversely affected. The conductivity of the composition normally increases as the percentage of conductive material is increased above the threshold, but increase often is not linear. If, for example, the conductive material is carbon black, the conductivity of the composition increases generally exponentially.

In compositions including essentially a latex carrier and conductive carbon black, the percentage of carbon black in the composition must be at least 15 percent to exceed the threshold level, will typically be in the range of 20 to 50 percent, and should not exceed 60 percent and at least 40% of the composition will be latex. If the composition includes also a filler such as clay, the percentage of latex carrier should not be less than about 20 percent.

Commercially available conductive materials, such as the conductive latex sold by UniRoyal Corp. under the name "Shok-Away", may also be used.

As shown in the following examples, secondary backings having the desired final surface resistivity, and anti-static carpets including such backings, can be produced using a wide range of conductive compositions.

EXAMPLE I

A 7 oz. per square yard jute secondary backing material was spray coated with a 15% solids mixture in an aqueous suspension. The solids consisted of approximately 25% conductive carbon black and 75% carboxylated SBR (styrene butadiene) latex. The coating was applied on one side of the backing at a weight of deposition (dry) of approximately 0.25 oz. per square yard, with no wicking or diffusing of solid material and negligible loss through the interstices of the open weave jute fabric. After drying, the overall surface resistivity of the coated backing, as measured by concentric ring electrodes of 2.75" and 10" diameter, was approximately $10^9$ ohms per square.

The coated backing was affixed to a variety of tufted primary backings, in the manner shown in FIG. 1, with the coated side of the secondary backing facing the primary backing.

The several samples were tested according to AATCC method 134-1969 and compared with tests using the same tufted primary backings, but standard non-conductive backings. The test results are shown in the table below.

| Tufted Primary Backing, Facing Yarn Description | KV Secondary STD Backing | KV Secondary Conductive Backing |
| --- | --- | --- |
| Nylon Control | 16.0 | 10.0 |
| Nylon, Conductive Yarns Every 0.5" | 1.8 | 1.2 |
| Nylon, Conductive Yarns Every 1.0" | 2.5 | 1.7 |
| Nylon, Conductive Yarns Every 1.5" | 3.6 | 2.6 |
| Nylon, Conductive Yarns Every 2.0" | 4.0 | 2.7 |
| Nylon, Conductive Yarns Every 3.0" | 4.2 | 2.8 |
| Nylon, Conductive Yarns Every 1.5", Cut at Frequent Intervals to Simulate Wear | 7.0 | 3.0 |

EXAMPLE II

A non-woven polyester backing was spray coated, as in Example I, with an aqueous suspension in which the solids consisted of 40% conductive carbon black and 60% carboxylated SBR latex. The coating was applied on the side of the backing at a weight of deposition (dry) of approximately 0.2 oz. per square yard. After drying, the overall surface resistivity of the coated backing, suitable for use as either a secondary or primary backing, was approximately $5 \times 10^8$ ohms per square.

EXAMPLE III

A 7 oz. per square yard jute secondary backing material was roller coated with a 14% solids mixture in an aqueous solution. The solids consisted of approximately 30% carbon black, 40% carboxylated SBR latex, and 30% clay. The coating was applied to one side of the backing at a weight of deposition (dry) of approximately 0.30 oz. per square yard. After drying, the overall surface resistivity of the coated backing was approximately $10^7$ ohms per square.

EXAMPLE IV

A 7 oz. per square yarn woven polypropylene secondary backing was sprayed with an aqueous suspension in which the backing solids content consisted of 70% carboxylated SBR latex and 30% carbon black. The coating was applied at a weight of deposition of approximately 0.5 oz. per square yard, and the overall surface resistivity of the coated backing after drying was approximately $10^8$ ohms per square.

EXAMPLE V

A 7 oz. per square yard jute secondary backing was sprayed with an aqueous suspension in which the solids content consisted of 20% carboxylated SBR latex, 40% clay and 40% carbon black. The coating was applied at a weight of deposition of approximately 0.5 oz. per square yard. After drying, the overall surface resistivity of the coated backing was approximately $10^7$ ohms per square.

EXAMPLE VI

The coated backings of Examples II, III, and IV were affixed to a variety of tufted primary backings using conventional non-conductive latex sizes with their coated with their coated side facing the primary backing. The several samples, and for comparison similar samples with standard non-conductive secondary backings, were then tested according to AATCC method 134—1969. In each case, the anti-static properties of the sample with the Example II, III and IV backings were generally as shown in the Table of Example I.

Other embodiments will be within the scope of the following claims.

What is claimed is:

1. In an antistatic carpet system where at least one out of every 40 carpet yarns is electrostatically conductive, the carpet yarns are tufted into a primary backing having a non-conductive polymer coating applied thereto securing the carpet yarns and a secondary backing, the system characterized in that the secondary backing further comprises a polymer conductive layer that is in direct contact with the polymer coating of the primary backing but is electrically isolated and not in direct contact with the carpet yarns or the electrostatically conductive yarns.

2. The system of claim 1 wherein the conductive polymer layer comprises a mixture of carbon black and latex and wherein the surface resistivity thereof is less than $10^{11}$ ohms per square.

3. A process for making an anti-static secondary carpet backing material comprising the steps of:
   (a) providing a fabric backing material;
   (b) coating an aqueous solution onto the backing, the solution containing approximately 14 to 20 percent by weight solid materials, the solid materials comprising from 15 to about 60 weight percent carbon black and at least 40 weight percent latex; and,
   (c) drying the coating.

4. The process of claim 3 wherein the surface resistivity of the coating ranges from $10^7$ to about $10^{10}$ ohms per square.

5. A process for making an anti-static carpet comprising the steps of:
   (a) providing an unfinished tufted carpet where face yarns have been tufted into a primary fabric backing material;
   (b) coating the carpet back with a non-conductive polymer latex layer;
   (c) providing a composite secondary backing made of a base and a conductive polymeric composition containing particulate carbon, the composition having a surface resistivity of less than $10^{11}$ ohms per square;
   (d) contacting the polymeric composition of the secondary backing with the non-conductive layer of unfinished carpet;
   (e) pressing the unfinished carpet and secondary backing into intimate contact but preventing the face yarns from coming into direct contact with the conductive composition; and,
   (f) drying the non-conductive layer to form a finished anti-static carpet.

6. The process of claim 5 wherein the particulate carbon black ranges from 15 to 60 weight percent of the conductive polymeric composition.

7. The process of claim 6 wherein in addition to the carbon black the composition comprises not less than 20 weight percent of the polymeric component which is latex.

8. The process of claim 5 wherein at least one out of every 40 face yarns is conductive.

9. An anti-static carpet comprising:
   (a) a non-conductive primary carpet fabric backing;

(b) a plurality of carpet face yarns tufted into the primary backing;

(c) a composite secondary backing comprising a fabric base uniformly coated with a polymeric composition containing particulate carbon, the composition having a surface resistivity of less than $10^{11}$ ohms per square;

(d) a non conductive polymer layer securing the face yarns to the primary backing and the coated surface of the secondary backing to the primary backing yet preventing the coating and face yarns from direct contact with each other.

10. The carpet of claim 9 wherein polymeric composition comprises from about 15 percent to 60 percent by weight carbon black and at least 40 percent by weight latex.

11. The carpet of claim 9 wherein the non-conductive layer is dried latex.

12. The carpet of claim 11 wherein the cured latex has a resistivity of $10^{13}$ ohms or greater and the resistivities are measured under conditions of about 20 percent relative humidity and about 70 degrees F.

13. The carpet of claim 9 wherein at least one of every 40 carpet face yarns is conductive.

14. The carpet of claim 9 wherein the polymeric composition weights from 0.1 ounce per square yard to 1 ounce per square yard.

* * * * *